(12) United States Patent
Kato

(10) Patent No.: US 8,364,876 B2
(45) Date of Patent: Jan. 29, 2013

(54) COMPUTER SYSTEM

(75) Inventor: Masaki Kato, Kanagawa-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 981 days.

(21) Appl. No.: 12/409,677

(22) Filed: Mar. 24, 2009

(65) Prior Publication Data

US 2009/0248931 A1    Oct. 1, 2009

(30) Foreign Application Priority Data

Mar. 27, 2008 (JP) ................... 2008-084479

(51) Int. Cl.
*G06F 13/24* (2006.01)

(52) U.S. Cl. ....................................... 710/260
(58) Field of Classification Search .............. 710/260
See application file for complete search history.

(56) References Cited

U.S. PATENT DOCUMENTS

| | | |
|---|---|---|
| 4,225,917 A | 9/1980 | Hepworth et al. |
| 4,638,428 A | 1/1987 | Gemma et al. |
| 5,319,785 A | 6/1994 | Thaller |
| 5,586,056 A | 12/1996 | Watanabe |
| 5,687,381 A | 11/1997 | Swanstrom et al. |
| 5,939,999 A | 8/1999 | Ohgaki |
| 2005/0027914 A1 | 2/2005 | Hammalund et al. |

FOREIGN PATENT DOCUMENTS

| | | |
|---|---|---|
| EP | 0 153 764 | 11/1993 |
| JP | 7-264217 | 10/1995 |

*Primary Examiner* — Paul R Myers
*Assistant Examiner* — Jeremy S Cerullo
(74) *Attorney, Agent, or Firm* — John J. Patti; Wade J. Brady, III; Frederick J. Telecky, Jr.

(57) ABSTRACT

A computer system is provided that can realize polling without increasing the processing burden on the processor. Data is read by a polling unit during a prescribed period from a prescribed address in the address space. Then, if the read data satisfies a prescribed condition, an interrupt signal is generated in the polling unit. Since processor can receive the interrupt from hardware instead of performing polling with firmware, the processing burden on processor 10 can be significantly reduced.

15 Claims, 4 Drawing Sheets

COMPUTER SYSTEM

CROSS-REFERENCE TO RELATED APPLICATIONS

This application claims priority to Japanese Patent Application No. 2008-084479, entitled "COMPUTER SYSTEM," filed on Mar. 27, 2008, which is hereby incorporated by reference for all purposes.

TECHNICAL FIELD

The invention relates generally to a computer system and, more particularly, to a computer system designed to reduce the processing load caused by polling.

BACKGROUND

Polling is a firmware method for performing a conditional branch corresponding to a predetermined status variation. In general, during polling, a processor periodically monitors the contents of a register mapped to a memory space and carries out a specific conditional branch when the contents meet a certain condition. Since it is necessary periodically to read the register contents with firmware during polling, there is a heavy processing load on the processor. Also, since a jump to conditional branching processing does not occur frequently, most of the read-out accesses performed periodically are wasted accesses that do not influence the processing flow and will cause a reduction in processing efficiency. Therefore, polling is usually a method that should be avoided. Realistically, however, polling with firmware is necessary in many cases when unexpected problems occur, for example, when a peripheral device neglects an expected interrupt processing or when proper hardware is not installed.

Examples of conventional systems are: Japanese Patent Application No. 7-264217; European Patent No. 0153764; U.S. Pat. No. 4,225,917; U.S. Pat. No. 4,638,428; U.S. Pat. No. 5,319,785; U.S. Pat. No. 5,586,056; U.S. Pat. No. 5,687,381; U.S. Pat. No. 5,939,999; U.S. Patent Pre-Grant Publ. No. 20050027914.

SUMMARY

A preferred embodiment of the present invention, accordingly, provides a computer system. The computer system in accordance with a preferred embodiment of the present invention has a processor and a polling unit. The polling unit reads out data during a predetermined period from a predetermined address in the address space accessible to the processor and generates an interrupt signal with respect to the processor when the data read satisfies a predetermined condition. The polling unit has a register, which has an assigned address in the address space and stores data used for setting at least one of the predetermined address, predetermined period, or predetermined condition. In the computer system, data is read by the polling unit during a predetermined period from a predetermined address in the address space. Then, when the data read satisfies a predetermined condition, an interrupt signal is generated to interrupt the processor in the polling unit. Since the polling performed by the processor can be interrupted, the processing load on the processor can be reduced. Also, since the address in the address space is assigned to the register of the polling unit, the register can be accessed by the processor. Consequently, the polling conditions, such as the address of the polling object, the polling period, and the interrupt signal can be set flexibly by the processor.

The condition for generating the interrupt signal can be set as the case in which the data read from the predetermined address has a predetermined value. Some examples are: the case in which the data is larger or smaller than a predetermined value; the case in which the data is within or outside of a predetermined range; or another condition regarding the value of the data. The condition for generating the interrupt signal can also be the case in which the condition regarding the data value is valid for a predetermined consecutive or accumulated number of times.

Preferably, the computer system has a bus that is shared by the processor and the polling unit for accessing the address space and a bus controller that assigns the processor bus use priority if a bus use request from the processor conflicts with a bus use request by the polling unit.

By adopting this configuration, if the bus use request from the processor conflicts with a bus use request from the polling unit, since the use request from the processor has higher priority, a reduction in the processing speed of the processor caused by polling can be restrained.

Also, preferably, the computer system has at least one first peripheral device and at least one second peripheral device for which access is required at a higher speed than that for the first peripheral device. The bus controller includes a separator that separates the bus signal input from the processor into a bus signal to the first peripheral device and a bus signal to the second peripheral device and a selector that selects either the bus signal to the first peripheral device separated in the separator or the bus signal input from the polling unit, and outputs it to the first peripheral device.

By adopting this configuration, since the selector is not set in the path of the bus signal to the second peripheral device, the access speed of the second peripheral device can be prevented from dropping.

The computer system can also have a first bus used by the processor to access the address space and a second bus used by the polling unit to access at least part of the address space.

By adopting this configuration, since the processor and polling unit use independent buses, the reduction in the processing speed of the processor due to polling can be restrained.

Alternatively, the computer system can have several functional units including the processor and polling unit and crossbar switch that connects the functional units to each other.

By adopting this configuration, since the functional units are connected to each other by the crossbar switch, the reduction in the processing speed of the processor due to polling can be restrained.

The second computer system disclosed in the present invention has a processor that can access a predetermined address space, a polling circuit that can periodically access the storage area with specific addresses in the address space and that supplies an interrupt signal to the processor when the data stored in the storage area are consistent with predetermined data, and an access control circuit that regulates access to the address space by the processor and access to the address space by the polling circuit. The access control circuit assigns the processor access priority when an access by the processor conflicts with an access by the polling circuit.

Preferably, in the computer system, the polling circuit includes a first storage circuit that holds the specific address, a second storage circuit that holds the predetermined data, and a comparison circuit that compares the data read from the storage area with the data stored in the second storage circuit. The first and second storage circuits are assigned in the address spaces in the processor, and the processor can rewrite the information in the first and second storage circuits.

Also, preferably, the computer system further has a peripheral device that is assigned in the address space of the processor and is accessed from the processor. The access control circuit regulates the access by the processor and the access by the polling circuit by monitoring the supplying of an enable signal from the processor to the peripheral device and the supplying of an enable signal from the polling circuit to the peripheral device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
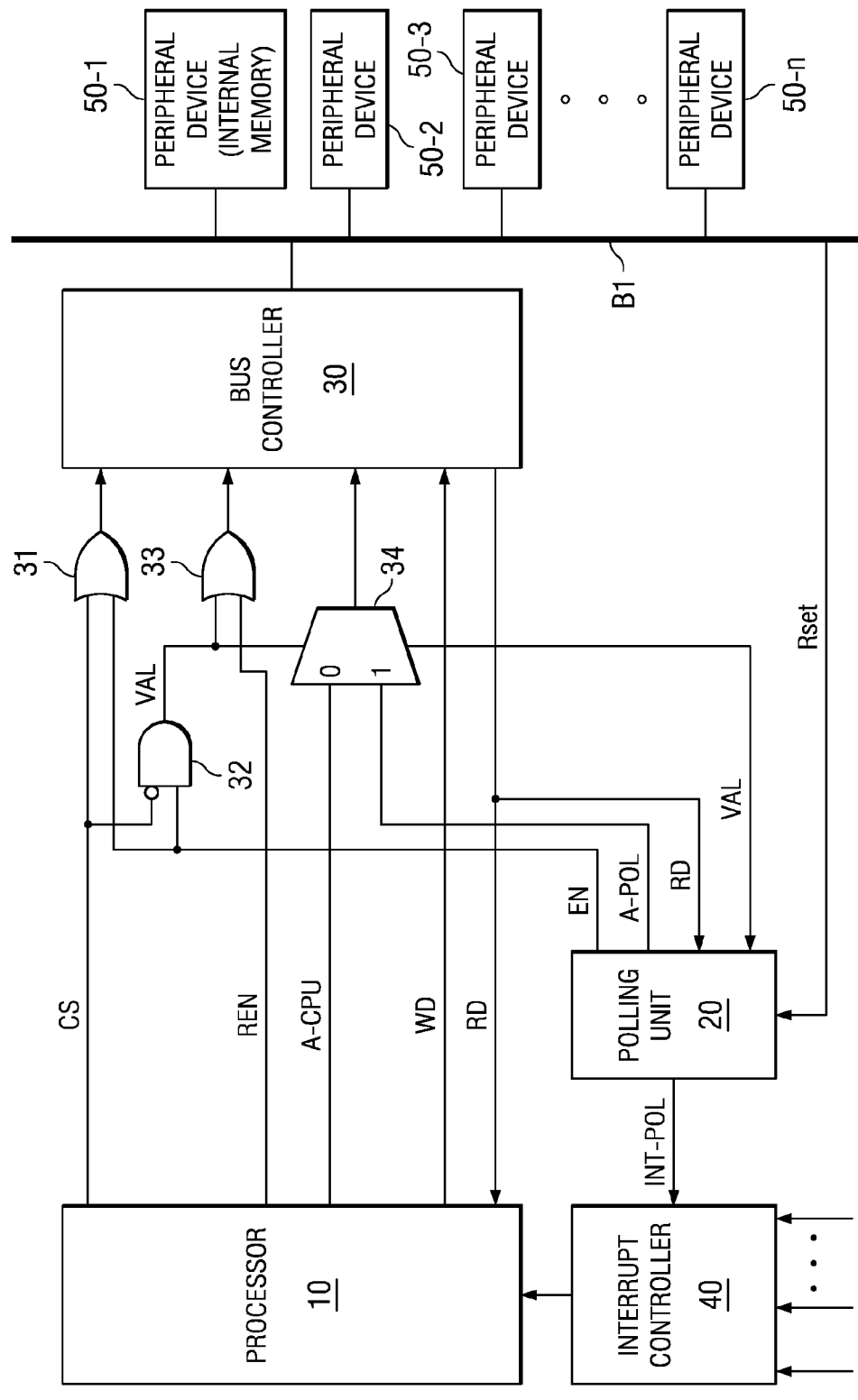
FIG. 1 is a diagram illustrating an example of the configuration of the computer system in accordance with a preferred embodiment of the present invention.

Refer now to the drawings wherein depicted elements are, for the sake of clarity, not necessarily shown to scale and wherein like or similar elements are designated by the same reference numeral through the several views.

According to the present invention, since the polling unit instead of the processor performs polling and the processor can receive interrupts from the polling unit, polling can be realized without increasing the processing burden on the processor.

The computer system disclosed in the present invention will be explained with reference to the figures.

Referring to FIG. 1 of the drawings, a computer system in accordance with a preferred embodiment of the present invention is shown. This computer system generally comprises a processor 10, a polling unit 20, a bus controller 30, a interrupt controller 40, bus B1, peripheral devices 50-1 through 50-$n$, logic circuits 31 through 33, and multiplexer or mux 34. Processor 10 generally receives a command code and carries out the corresponding operation or control and that can access peripheral devices 50-1 through 50-$n$ via bus B1. In the example shown in FIG. 1, peripheral device 50-1 is an internal memory. Processor 10 sequentially receives and interprets the command codes stored in the internal memory 50-1 and executes the commands. Bus controller 30 generally controls the transmission of signals on bus B1, and it controls the data transmission timing between processor 10 and several peripheral devices (50-1 through 50-$n$) and regulates several access requests. Interrupt controller 40 generally uses for reporting the occurrence of an interrupt to processor 10, and it sends the interrupt signals (INT1-INTm, INT-POL) generated by several hardware units to processor 10 in the appropriate order and with the appropriate timing. Peripheral devices 50-1 through 50-$n$ are circuits for realizing the various functions under the control of processor 10. Polling unit 23 is a circuit that performs polling according to the operating conditions set by processor 10. When a prescribed state of a peripheral device is detected by polling, interrupt signal INT-POL is generated with respect to processor 10. In other words, polling unit 20 reads out data RD during a prescribed period from a prescribed address in the address space that can be accessed by processor 10. When the data RD read satisfy the prescribed condition, an interrupt signal INT-POL is generated with respect to processor 10.

Figure 2:
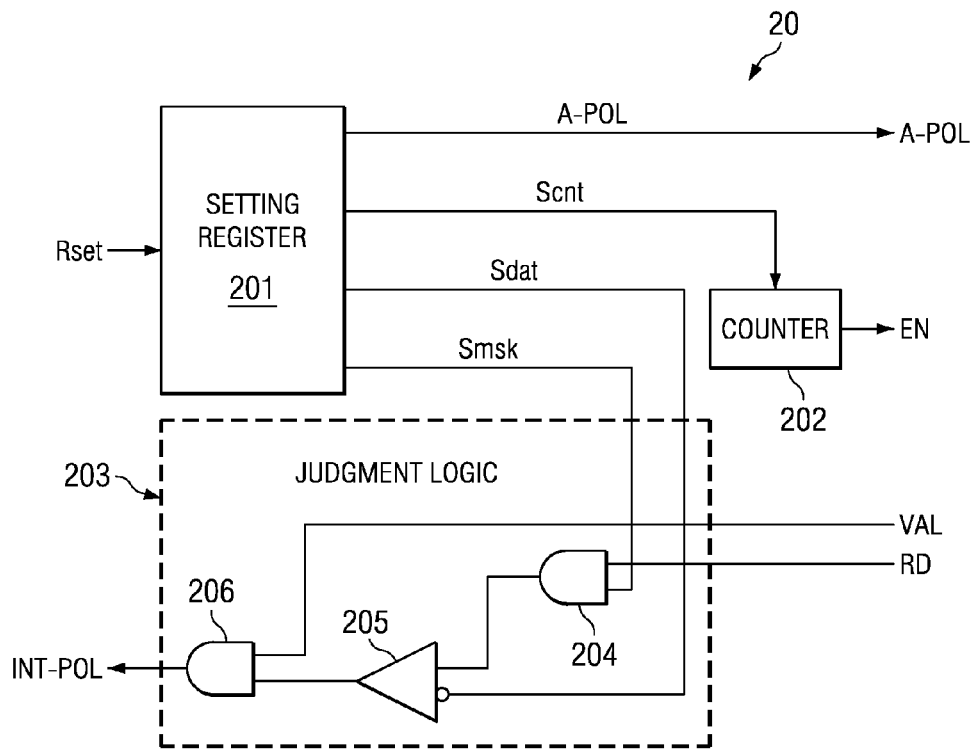
FIG. 2 is a diagram illustrating an example of the configuration of the polling unit.

Now turning to FIG. 2 of the drawings, an example of the polling circuit 20 can be seen. Polling circuit generally comprises a setting register 201, a counter 202, and judgment logic 203. Setting register 201 stores the setting data Rset regarding the operating conditions of polling. Setting data Rset, for example, include data A-POL at the address as the polling object, polling period data Scnt, expected value Sdat of the data stored at the address as the polling object, and mask data Smsk used when comparing expected value Sdat with read-out data RD. Setting register 201 is assigned an address in the address space that can be accessed by processor 10. Processor 10 accesses setting register 201 via bus B1 and writes the setting data Rset into setting register 201. Counter 202 outputs enable signal EN with value "1" indicating the execution of polling during a certain period corresponding to the polling period data Scnt stored in setting register 201. Judgment logic 203 determines whether the data RD read from address (A-POL) as the polling object satisfy the prescribed conditions and outputs an interrupt signal INT-POL corresponding to the judgment result. For example, judgment logic 203 determines whether the data RD read from address (A-POL) as the polling object are consistent with the expected value Sdat and outputs interrupt signal INT-POL if they are consistent. Also, judgment logic 203 ignores whether some of the bits in the read data RD set by mask data Smsk satisfy the prescribed conditions. For example, judgment logic 203 forcibly sets some of the bits of the read data RD to a prescribed value ("1" or "0") corresponding to mask data Smsk so that some bits will not affect the condition judgment result.

As shown in FIG. 2, judgment logic 203 includes logic circuits 204-206. AND gate 204 masks bits of the read data RD corresponding to data mask Smsk. That is, AND gate 204 forcibly sets some of the bits of read data RD to "0" or "1" by calculating the logical product or logical sum of mask data Smsk and the corresponding bits of read data RD. Comparator 205 compares the expected value Sdat stored in set register 201 with the read data RD masked by AND 204 and outputs a "1" if these values are consistent. AND gate 206 calculates the logical product of the output signal of logic circuit 205 and valid signal VAL and outputs the calculation result as interrupt signal INT-POL.

Turning back to FIG. 1, logic circuits 31-33 and selection circuit 34 generally regulate the switching and access of two bus signals so that processor 10 and polling unit 20 use the common bus B1. Logic circuits 31-33 and selection circuit 34 assign processor 10 bus use priority when a request from processor 10 to use bus B1 conflicts with a request from polling unit 20 to use bus B1. OR gate 31 ORs the enable signal of polling unit 20 with chip selection signal CS output from processor 10 to bus controller 30. In other words, OR gate 31 outputs the logical sum of chip selection signal CS and enable signal EN to bus controller 30. AND gate 32 outputs valid signal VAL indicating whether polling is valid. If enable signal EN is "1" and the chip selection signal CS is "0," a "1" will be output; otherwise, a "0" will be output. In other words, AND gate 32 outputs enable signal EN as valid signal VAL when chip selection signal CS is inactive ("0") and sets valid signal VAL to "0," irrespective of the value of enable signal EN if chip selection signal CS is active ("1"). OR gate 33 ORs the valid signal VAL with the read enable signal REN output from processor 10 to bus controller 30. In other words, OR gate 33 outputs the logical sum of read enable signal REN and valid signal VAL to bus controller 30. Mux 34 selects the address data A-CPU of processor 10 or the address data A-POL of polling unit 20 and outputs it to bus controller 30. Selection circuit 34 selects address data A-CPU if valid signal VAL is "0" and selects address data A-POL if valid signal VAL is "1."

For example, during initialization at the time of startup, processor 10 writes setting data to the setting register of each device on bus B1. As a result, address data A-POL of the polling object, polling period data Scnt, expected value Sdat, mask data Smsk are stored in the setting register 201 of polling unit 20. Polling unit 20 sets the value of enable signal EN to "1" during a certain period corresponding to polling period Scnt. When enable signal EN is "1," if the chip selection signal CS of processor 10 is "0" (that is, if processor 10 is not accessing bus B1), the valid signal VAL output in logic circuit 32 becomes active ("1"), and polling becomes valid. In this case, the signal output in logic circuit 33 becomes "1" to report that it is possible to read data with respect to bus controller 30. Also, selection circuit 34 selects address data A-POL of polling unit 20 and outputs it to bus controller 30. Bus controller 30 accesses the address designated by address data A-POL via bus B1 and reads out data from the address or from the internal memory area. Polling unit 20 performs masking of mask data Smsk to the data RD read from the polling objected address and compares the masked data with expected value Sdat. If they are consistent, polling unit 20 sets interrupt signal INT-POL to active ("1"), and the generation of an interrupt by polling unit 20 is reported to interrupt controller 40. The notified interrupt controller 40 reports the generation of the interrupt by polling unit 20 to processor 10 at an appropriate timing corresponding to the generation status of other interrupts (INT1-INTm) at that point in time. Processor 10 will shift to the interrupt processing routine when it receives notification of the generation of an interrupt. On the other hand, if enable signal EN is "1," if the chip selection signal CS of processor 10 is "1" (that is, if processor 10 is accessing bus B1), the valid signal output in logic circuit 32 becomes inactive ("0"), and polling becomes invalid. In this case, since selection circuit 34 selects the address data A-POL of polling unit 20, processor 10 has priority to access bus B1. Also, if valid signal VAL is inactive, the output of the interrupt signal INT-POL from polling unit 20 is prohibited.

As explained above, by using the computer system of FIG. 1, data RD are read during a prescribed period from a prescribed address in the address space by polling unit 20. If the read data RD satisfy a prescribed condition, an interrupt signal INT-POL is generated in polling unit 20 with respect to processor 10. Since processor 10 can receive the interrupt generated by hardware instead of performing polling by firmware, the processing burden on processor 10 can be significantly reduced. Also, since an address in the address space of processor 10 is assigned to the setting register 201 of polling unit 20, processor 10 can access setting register 201. In this way, the address data A-POL of the object polled, the polling period data Scnt, the expected value Sdat read by polling, and the like can be set freely by processor 10 so that various conditions in the polling operation can be changed flexibly.

In addition, polling unit 20 can be operated by the same clock signal as processor 10 since it can access a register that can be read from processor 10. Therefore, there is no need to use a special asynchronous transfer circuit and the configuration becomes relatively simple. Since the configuration of polling 20 is simple and the continuous power consumption is low, the overall power consumption can be reduced compared with the case in which polling is performed by firmware in processor 10.

Also, in the computer system of FIG. 1, when the use request on bus B1 from processor 10 conflicts with the use request on bus B1 from polling unit 20, the use request by processor 10 has higher priority. Therefore, a reduction in the processing speed of processor 10 caused by polling can be restrained.

In the computer system shown in FIG. 1, the entire address space as the access target of processor 10 is used as the polling object, and internal memory 50-1 is also included in the polling object. Therefore, logic circuits 31-33 and selection circuit 34 are arranged in the path of the bus signal (address data, control signal, and the like) to internal memory 50-1. However, since the signal path between the processor and the internal memory is usually a critical path, if circuits—as one of the reasons for a delay—are arranged in the path, the overall performance may be affected. The computer system disclosed in this embodiment reduces the signal delay in the bus signal path of internal memory or other relatively high-speed peripheral devices.

Figure 3:
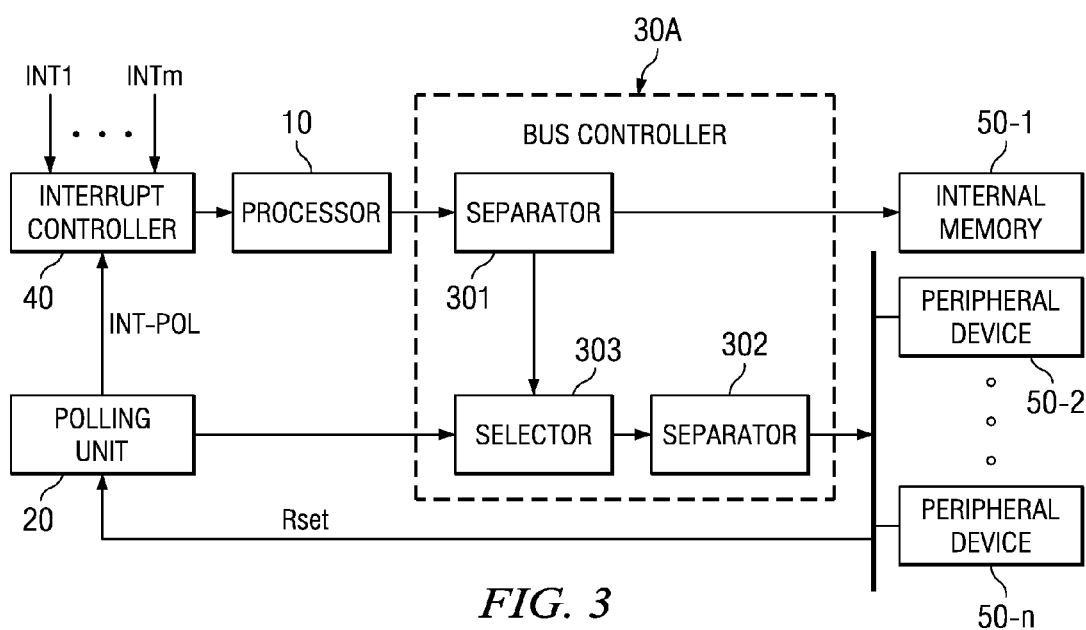
FIG. 3 is a diagram illustrating an example of the configuration of the computer system disclosed in accordance with a preferred embodiment of the present invention.

Turning to FIG. 3, a diagram illustrating an example of the configuration of the computer system is disclosed. The computer system shown in FIG. 3 is similar to the computer system shown in FIG. 1 except that the bus controller 30 in the computer system shown in FIG. 1 has been replaced with bus controller 30A, while logic circuits 31-33 and selection circuit 34 are omitted. Like bus controller 30 explained above, bus controller 30A generally controls the transmission of signals over bus B1. A difference from bus controller 30 is that a circuit used for regulating switching and accessing of the bus signals of processor 10 and polling unit 20 is incorporated into this bus controller 30A.

Bus controller 30A shown in FIG. 3 has separators 301 and 302 as well as selector 303 as that are generally used for switching the bus signals. Separator 301 separates the bus signal input from processor 10 into a bus signal to internal memory 50-1 and a bus signal to other peripheral devices (50-2 through 50-n). Selector 303 selects the bus signal to other peripheral devices (50-2 through 50-n) are separated in separator 301 or the bus signal input from polling unit 20.

Separator 302 further separates the bus signal selected in selector 303 and outputs the separated bus signals to respective peripheral devices.

In the computer system shown in FIG. 3, the bus signal to internal memory 50-1, which generally requires relatively high-speed access, is separated in separator 301, and the bus signal is selected in selector 303 in the next stage. Therefore, delay elements, such as the logic circuits 31-33 and delay circuit 34, can be excluded from the bus signal path to internal memory 50-1. Thus, polling can be performed without sacrificing the timing for access to internal memory 0-1.

Figure 4:
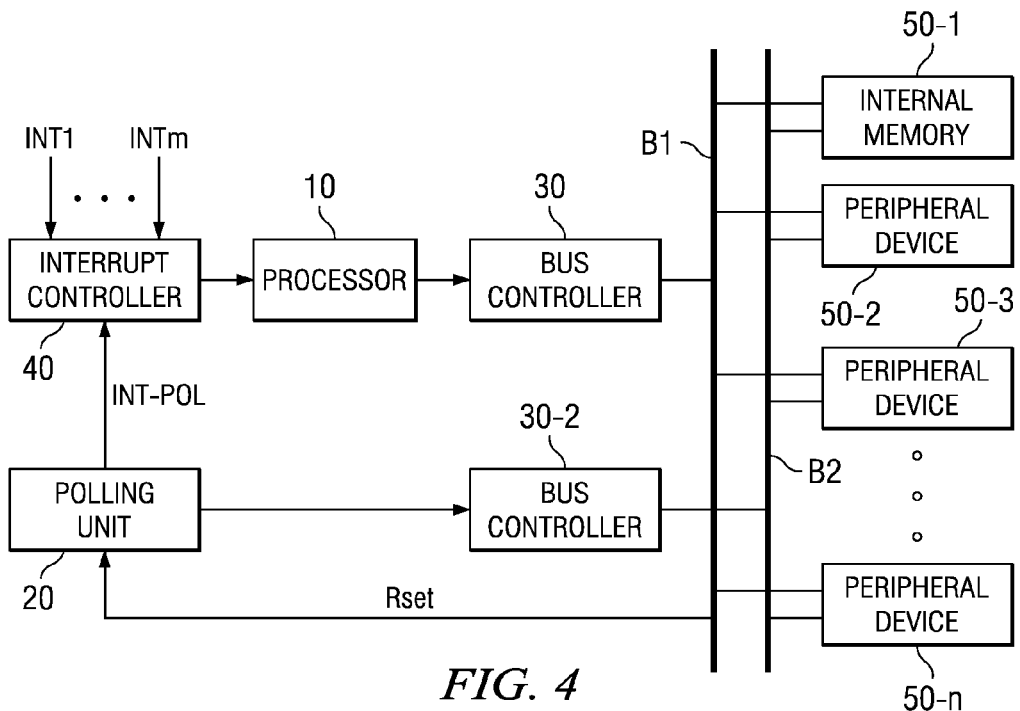
FIG. 4 is a diagram illustrating an example of the configuration of the computer system disclosed in accordance with a preferred embodiment of the present invention.

Turning to FIG. 4, a diagram illustrating an example of the configuration of the computer system is disclosed. The computer system shown in FIG. 4 omits the logic circuits 31-33 and selection circuit 34 in the computer system shown in FIG. 1. Instead, bus controller 30-2 and bus B2, which are used for polling, are included. Also, in the computer system shown in FIG. 4, each peripheral device (50-1 through 50-n) has a register-reading circuit for polling. Other constituent elements of the computer system shown in FIG. 4 are the same as those in the computer system shown in FIG. 1. Bus controller 30-2 generally controls the transmission of signals over bus B2, and it controls the timing of data reading between polling unit 20 and several peripheral devices (50-1 through 50-n). Each peripheral device (50-1 through 50-n) is equipped with a circuit used for reading the data in register via bus B1 and a circuit used for reading the data in register via bus B2.

With adoption of bus B2, which is used for polling independently of bus B1 of processor 10, there is no need to switch the bus signals using logic circuits 31-33 and selection circuit 34 shown in FIG. 1. Also, since processor 10 and polling unit 20 can access peripheral devices (50-1 through 50-n) side-by-side, the bus bandwidth of processor 10 can contribute to improving the processing speed without being sacrificed for polling.

Figure 5:
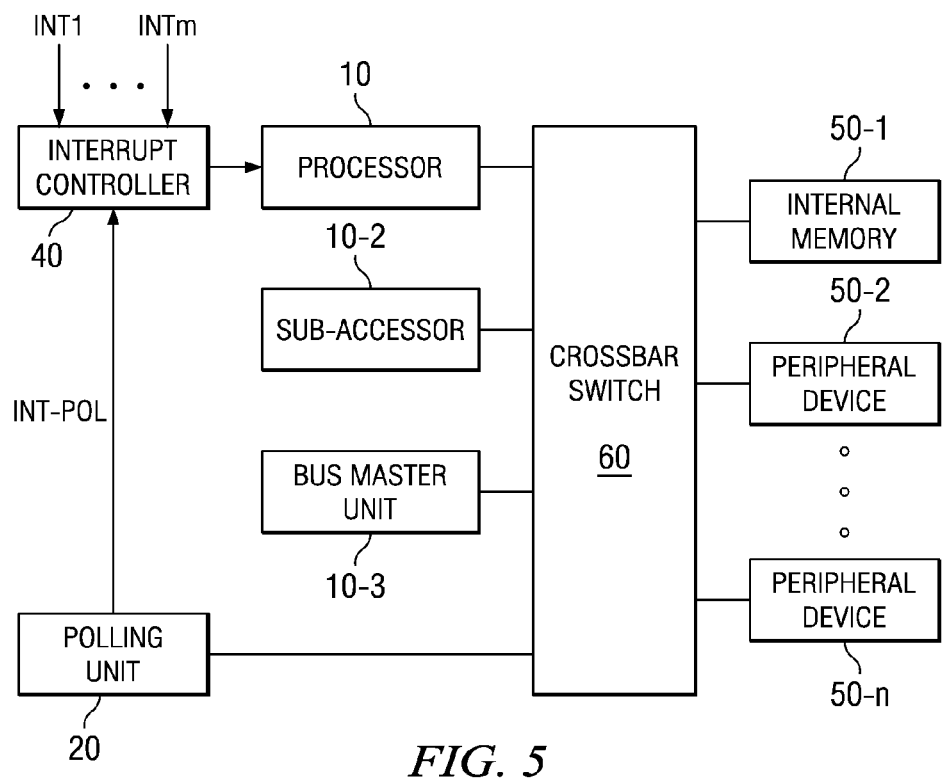
FIG. 5 is a diagram illustrating an example of the configuration of the computer system disclosed in accordance with a preferred embodiment of the present invention.

Turning to FIG. 5, a diagram illustrating an example of the configuration of the computer system is disclosed. The computer system shown in FIG. 5 includes processor 10, sub-processors 10-2, bus master unit 10-3, polling unit 20, interrupt controller 40, peripheral devices 50-1 through 50-n, and crossbar switch 60. Sub-processor 10-2 generally performs operations or executes control processes corresponding to command codes. It carries out processing independently of processor 10. Bus master unit 10-3 generally performs control processes for transferring data between peripheral devices (50-1 through 50-n) without passing through processors (10, 10-2). Crossbar switch 60 generally connects multiple functional units (processor 10, sub-processor 10-2, bus master 10-3, polling unit 20, peripheral devices 50-1 through 50-n) to each other. Crossbar switch 60 also includes several signal lines that intersect in a lattice pattern and includes several switches arranged at each intersection. By controlling the switches at the intersections, it can connect the functional units connected to each signal line to each other. Crossbar switch 60 can perform one-to-one communication of several groups at the same time for several functional units. It can also control the switches such that several functional units will not simultaneously access a single functional unit. If the crossbar switch 60 is used, access of internal memory 50-1 by processor 10 and access of peripheral device 50-2 by polling unit 20 can be performed simultaneously so that polling can be performed without sacrificing the bus bandwidth of processor 10. Therefore, decrease in the processing speed of the processor can be restrained. Also, since there is no need to use a special regulation circuit such as logic circuits 31-33 and selection circuit 34 shown in FIG. 1, and it is necessary to add only polling unit 20 as a single functional unit, this embodiment can be easily applied to an existing computer system using a crossbar switch.

Figure 6:
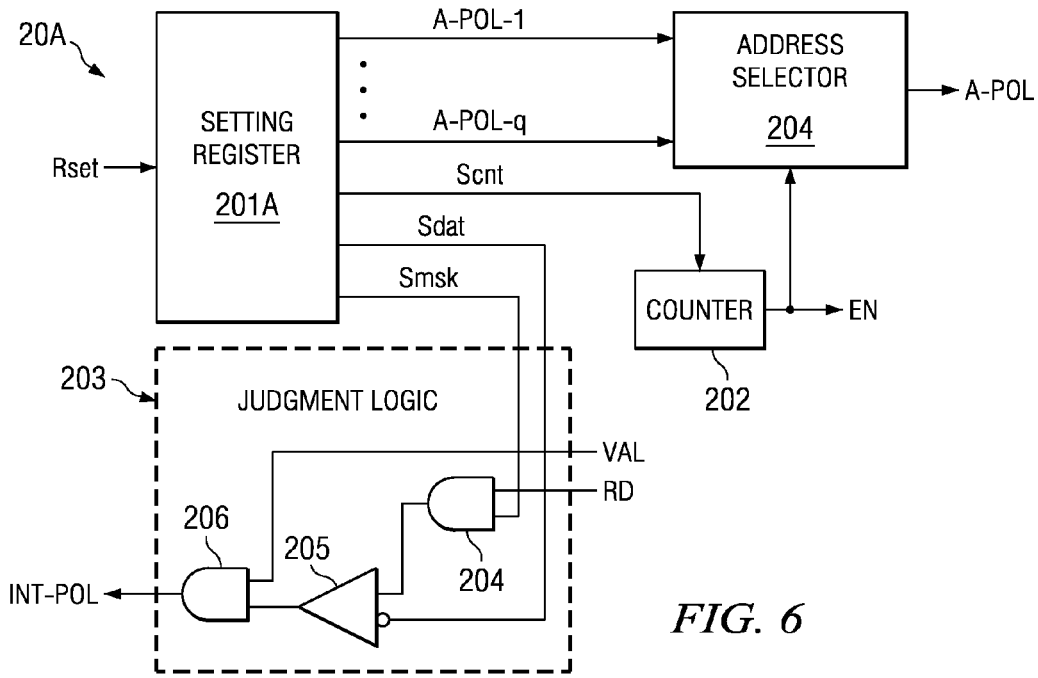
FIG. 6 is a diagram illustrating an example of the configuration of the computer system disclosed in accordance with a preferred embodiment of the present invention.

Turning to FIG. 6, a diagram illustrating an example of the polling unit in the computer system is disclosed. In the computer system disclosed in FIG. 6, polling unit 20 is been replaced with polling unit 20A shown in FIG. 6, while other constituent elements are the generally same. Polling unit 20A generally comprises setting register 201A, counter 202, judgment logic 203, and address selecting part 204. Setting register 201A, like setting register 201 in FIG. 2, generally stores setting data Rset regarding the operating conditions of polling. It differs from setting register 201 in that it can store address data A-POL-1 through A-POL-q (q is an integer of 2 or larger) of several polling objects. Address selector 204 selects the address of one polling object, in order, from several addresses set in setting register 201A. For example, it sequentially selects several address data (A-POL-1 through A-POL-q) during a certain period corresponding to polling period data Scnt and outputs the selected address data as the address data A-POL of the polling object. Address selector 204 has a counter that counts the pulses of enable signal EN output from counter 202 and a selector that selects one address data from several address data (A-POL-1 through A-POL-q) corresponding to the count value of the counter. The counter, for example, repeatedly outputs q counted values from "0" to "q−1," and the selector selects and outputs the address data corresponding to each of the count values.

According to the computer system of FIG. 6, several addresses are set in polling unit 20A, and each address can be polled sequentially during a certain period. Therefore, the configuration can be simplified compared with the case when the same polling operation is realized by several polling units. Also, since address data (A-POL through 1-POL-q) can be selected sequentially in address selector 204, it is possible to repeatedly poll several polling objects in the desired order.

Figure 7:
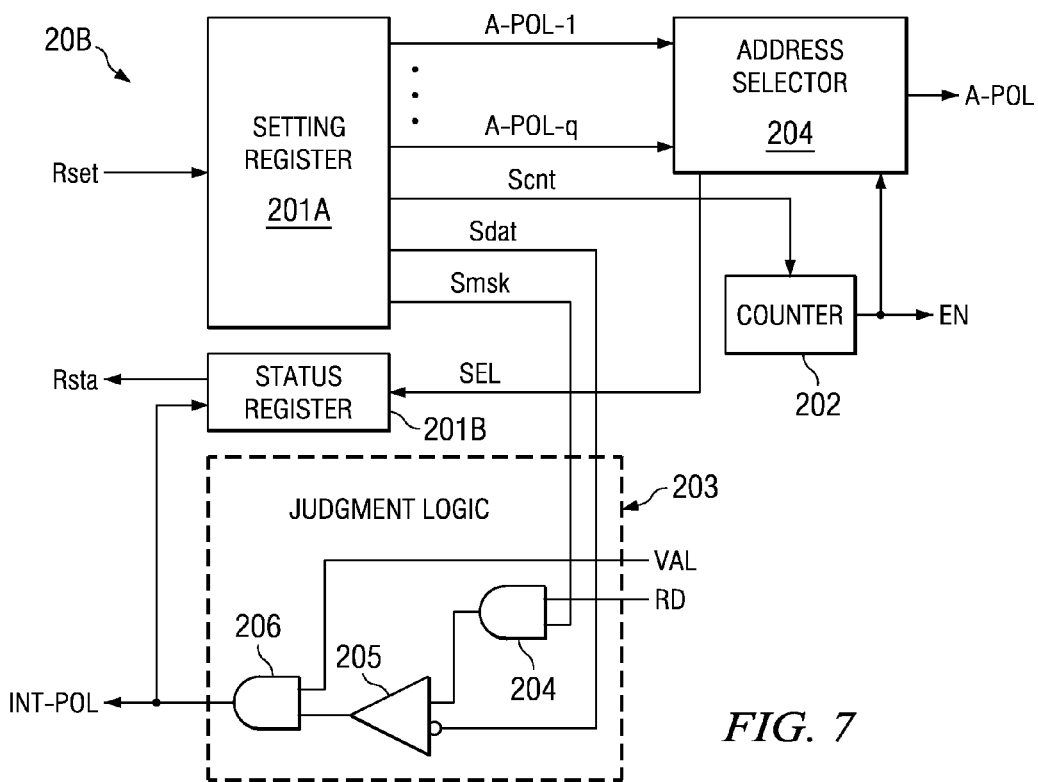
FIG. 7 is a diagram illustrating an example of the configuration of the polling unit.

Turning to FIG. 7, a diagram illustrating the polling unit is shown. Polling unit 20B generally comprises a status register 201B, while the rest of the configuration is similar to polling unit 20A shown in FIG. 6. Status register 201B generally stores the data indicating the address of the polling object as the reason for generating interrupt signal INT-POL when the interrupt signal INT-POL is generated with respect to processor 10. For example, when interrupt signal INT-POL is active ("1"), status register 201B stores signal SEL (for example, the count value of the counter included in address selector 204) used for controlling selection of the address data in the selector of address selector 204. Status register 201B has an address assigned in the address space that can be accessed by processor 10. Therefore, processor 10 can access status register 201B and reads its contents. When status register 201B that can be accessed from processor 10 is adopted and the data regarding the polling object address as the reason for generating an interrupt is stored in the status register 201B as described above, processor 10 can identify the polling object as the reason for generating the interrupt. Consequently, processor 10 can carry out a different process for each polling object.

As described above, judgment logic 203 determines whether the data RD read from address A-POL is consistent with a prescribed value. However, the present invention is not limited to this example. For example, judgment logic 203 can evaluate other conditions regarding the value of the read data, RD for example, determine whether it is larger or smaller than a prescribed value or is included in a prescribed range. Also, if a condition regarding the value of the read data RD is valid for a prescribed number of consecutive or accumulated times, the judgment logic 203 can also use it as the condition for generating interrupt signal INT-POL.

Also as described above, polling is invalidated if there is conflict in bus access between processor 10 and polling unit 20. The present invention, however, is not thereby limited. For example, if the bus accesses conflict, the polling operation can be set in a waiting state, while the access by processor 10 has priority. After the access by processor 10 is ended, the polling in the waiting state can be restarted.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a bus;
    a processor;
    an interrupt controller that is coupled to the processor;
    a bus controller that is coupled between the processor and the bus; and
    a polling unit including:
        a setting register that is coupled to the bus;
        a counter that is coupled to the setting register; and
        judgment logic that is coupled to the setting register and the interrupt controller.

2. The apparatus of claim 1, wherein the judgment logic further comprises:
    a first AND gate that is coupled to the setting register;
    a comparator that is coupled to the first AND gate and the setting register; and
    a second AND gate that is coupled to the comparator.

3. The apparatus of claim 2, wherein the apparatus further comprises:
    a first OR gate that is coupled to the processor, the counter, and the bus controller;
    a third AND gate that is coupled to the processor and the counter;
    a second OR gate that is coupled to the processor, the third AND gate, and the bus controller; and
    a multiplexer that is coupled to the processor, the setting register, and the bus controller.

4. The apparatus of claim 1, wherein the bus controller further comprises:
    a first separator that is coupled to the processor;
    a selector that is coupled to the first separator and the polling unit; and
    a second selector that is coupled to the selector and the bus.

5. The apparatus of claim 1, wherein the bus further comprises:
    a first bus that is coupled to the bus controller; and
    a second bus that is coupled to the polling unit.

6. The apparatus of claim 5, wherein the bus controller further comprises:
    a first bus controller that is coupled to the processor and the first bus; and
    a second bus controller that is coupled to the polling unit and the second bus.

7. The apparatus of claim 1, wherein the polling unit further comprises an address selector that is coupled to the setting register and the counter.

8. The apparatus of claim 7, wherein the polling unit further comprises a status register that is coupled to the address selector and the judgment logic.

9. An apparatus comprising:
    a crossbar switch;
    a processor that is coupled to the crossbar switch;
    an interrupt controller that is coupled to the processor;
    a sub-processor that is coupled to the crossbar switch;
    a bus master unit that is coupled to the crossbar switch; and
    a polling unit including:
        a setting register that is coupled to the bus;
        a counter that is coupled to the setting register; and
        judgment logic that is coupled to the setting register and the interrupt controller.

10. The apparatus of claim 1, wherein the judgment logic further comprises:
    a first AND gate that is coupled to the setting register;
    a comparator that is coupled to the first AND gate and the setting register; and
    a second AND gate that is coupled to the comparator.

11. The apparatus of claim 1, wherein the polling unit further comprises an address selector that is coupled to the setting register and the counter.

12. The apparatus of claim 7, wherein the polling unit further comprises a status register that is coupled to the address selector and the judgment logic.

13. An apparatus comprising:
    a bus;
    a processor;
    an interrupt controller that is coupled to the processor;
    a bus controller that is coupled between the processor and the bus; and
    a polling unit including:
        a setting register that is coupled to the bus;
        a counter that is coupled to the setting register;
        a first AND gate that is coupled to the setting register, the bus controller, and the processor;
        a comparator that is coupled to the first AND gate and the setting register; and
        a second AND gate that is coupled to the comparator;
        a first OR gate that is coupled to the processor, the counter, and the bus controller;
        a third AND gate that is coupled to the processor and the counter;
        a second OR gate that is coupled to the processor, the third AND gate, and the bus controller; and
        a multiplexer that is coupled to the processor, the second AND gate, the setting register, and the bus controller.

14. The apparatus of claim 13, wherein the polling unit further comprises an address selector that is coupled to the setting register and the counter.

15. The apparatus of claim 14, wherein the polling unit further comprises a status register that is coupled to the address selector and the judgment logic.

* * * * *